(12) United States Patent
Miyakoshi et al.

(10) Patent No.: US 11,173,736 B2
(45) Date of Patent: Nov. 16, 2021

(54) IMAGE FORMING APPARATUS

(71) Applicant: FUJIFILM BUSINESS INNOVATION CORP., Tokyo (JP)

(72) Inventors: Kunio Miyakoshi, Kanagawa (JP); Masato Matsuzuki, Kanagawa (JP); Yoshiyuki Taguchi, Kanagawa (JP); Maki Hasegawa, Kanagawa (JP); Chikara Manabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/806,176

(22) Filed: Mar. 2, 2020

(65) Prior Publication Data

US 2021/0075916 A1 Mar. 11, 2021

(30) Foreign Application Priority Data

Sep. 5, 2019 (JP) .............................. JP2019-161895

(51) Int. Cl.
*B41J 29/393* (2006.01)
*H04N 1/00* (2006.01)
*B41J 2/045* (2006.01)

(52) U.S. Cl.
CPC ......... *B41J 29/393* (2013.01); *B41J 2/04505* (2013.01); *B41J 2/04558* (2013.01); *H04N 1/00005* (2013.01); *H04N 1/00037* (2013.01); *H04N 1/0066* (2013.01); *H04N 1/00087* (2013.01); *B41J 2029/3935* (2013.01); *B41J 2203/011* (2020.08)

(58) Field of Classification Search
CPC .. B41J 2/04505; B41J 2/04558; B41J 2/2146; B41J 11/008; B41J 2203/011; B41J 2029/3935; B41J 29/393
See application file for complete search history.

(56) References Cited

U.S. PATENT DOCUMENTS 9,028,027 B2   5/2015   Bell et al.
9,186,885 B2   11/2015  Boland et al.

FOREIGN PATENT DOCUMENTS

JP   H09-20002 A   1/1997
JP   2015-13476 A  1/2015
JP   6417858 B2    11/2018

*Primary Examiner* — Julian D Huffman
(74) *Attorney, Agent, or Firm* — Oliff PLC

(57) ABSTRACT

An image forming apparatus includes an image forming unit, first and second detectors, and a corrector. The image forming unit includes first and second image forming units disposed downstream of the first unit in a transport direction of a recording medium and causes the first and second units to form predetermined correction images onto the recording medium. The first detector is disposed downstream of the first unit and upstream of the second unit in the transport direction, and detects the correction image formed by the first unit. The second detector is disposed downstream of the second unit in the transport direction and detects the correction image formed by the second unit. The corrector corrects an image position of the second unit in a width direction of the recording medium by using the correction images formed by the first and second units and detected by the first and second detectors.

19 Claims, 5 Drawing Sheets

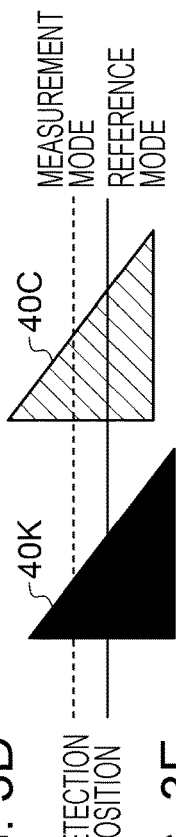
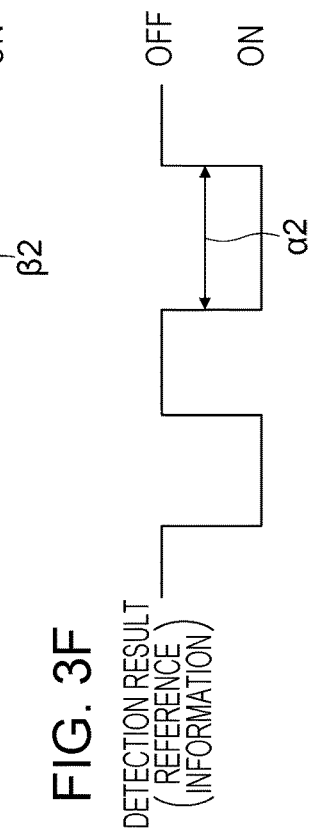
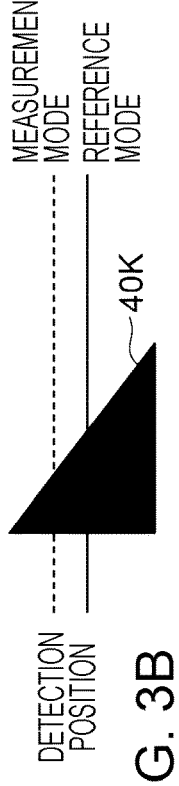
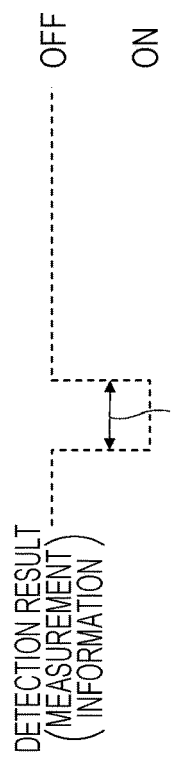
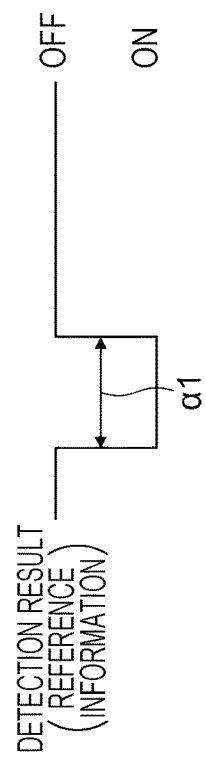
FIG. 3A  FIG. 3D
FIG. 3B  FIG. 3E
FIG. 3C  FIG. 3F

IMAGE FORMING APPARATUS

CROSS-REFERENCE TO RELATED APPLICATIONS

This application is based on and claims priority under 35 USC 119 from Japanese Patent Application No. 2019-161895 filed Sep. 5, 2019.

BACKGROUND

(i) Technical Field

The present disclosure relates to image forming apparatuses.

(ii) Related Art

Japanese Unexamined Patent Application Publication No. 2015-013476 discloses a system and a method for adjusting the orientation of a print head in a printing system.

SUMMARY

Aspects of non-limiting embodiments of the present disclosure relate to suppressing positional displacement of an image position in a width direction of a recording medium, as compared with a configuration that detects a correction image, formed by a first image forming unit disposed at the most upstream position in a transport direction of the recording medium, by using a detector located upstream of a second image forming unit disposed downstream of the first image forming unit, and that corrects the image position of the second image forming unit in the width direction of the recording medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including an image forming unit, a first detector, a second detector, and a corrector. The image forming unit includes a first image forming unit and a second image forming unit disposed downstream of the first image forming unit in a transport direction of a recording medium and causes the first image forming unit and the second image forming unit to form predetermined correction images onto the recording medium. The first detector is disposed downstream of the first image forming unit in the transport direction and upstream of the second image forming unit in the transport direction and detects the correction image formed by the first image forming unit. The second detector is disposed downstream of the second image forming unit in the transport direction and at least detects the correction image formed by the second image forming unit. The corrector corrects an image position of the second image forming unit in a width direction of the recording medium by using the correction image formed by the first image forming unit and detected by the first detector and the correction image formed by the second image forming unit and detected by the second detector.

BRIEF DESCRIPTION OF THE DRAWINGS

Exemplary embodiments of the present disclosure will be described in detail based on the following figures, wherein:

FIGS. 3A to 3F illustrate an example of detection results obtained by a first detector and a second detector according to a first exemplary embodiment;

DETAILED DESCRIPTION

An inkjet image forming apparatus 10 according to an exemplary embodiment will be described below with reference to the drawings.

First Exemplary Embodiment

Figure 1:
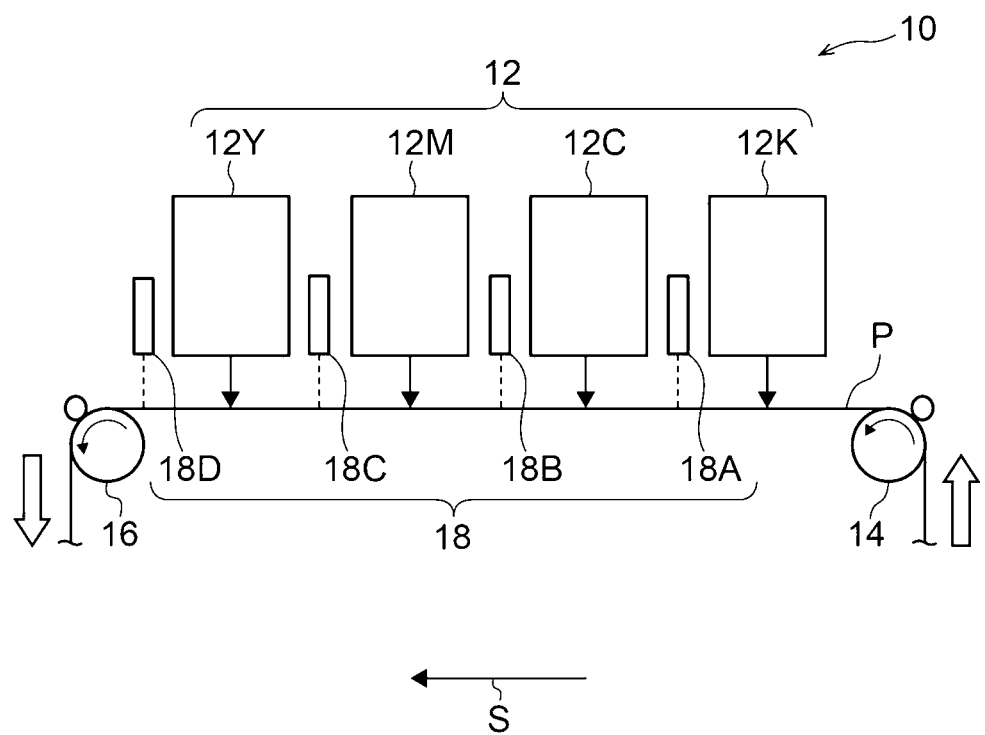
FIG. 1 illustrates an example of the configuration of an image forming apparatus according to an exemplary embodiment.

As shown in FIG. 1, the image forming apparatus 10 includes a head unit 12, transport rollers 14 and 16, and a detector 18.

The head unit 12 forms an image onto a continuous sheet (i.e., a roll sheet) P as a recording medium by ejecting ink droplets onto the continuous sheet P. The head unit 12 is an example of an image forming unit. The head unit 12 includes a head 12K that forms a black (K) image, a head 12C that forms a cyan (C) image, a head 12M that forms a magenta (M) image, and a head 12Y that forms a yellow (Y) image. In the first exemplary embodiment, the head 12K, the head 12C, the head 12M, and the head 12Y each form a predetermined correction image onto the continuous sheet P. This will be described in detail later.

The heads of the head unit 12 are arranged in a transport direction S of the continuous sheet P in the order: K, C, M, and Y. The order in which the heads of the head unit 12 are arranged is not limited in particular. If C, M, Y, and K are not to be distinguished from one another in the following description, C, M, Y, and K added to the reference signs will be omitted. The head 12K is an example of a first image forming unit, the head 12C is an example of a second image forming unit, and the head 12M is an example of a third image forming unit.

In the first exemplary embodiment, nozzles of each head of the head unit 12 are individually given nozzle numbers starting from 1, such as 1, 2, and so on, so as to distinguish the nozzles from one another. In the first exemplary embodiment, the nozzles of each head of the head unit 12 are arranged in the width direction of the continuous sheet P (referred to as "sheet width direction" hereinafter).

The transport roller 14 is rotatably supported by a frame member (not shown). The transport roller 14 has the continuous sheet P wrapped therearound. The transport roller 14 rotates counterclockwise, as viewed from the front in FIG. 1, so as to transport the continuous sheet P relative to the head unit 12.

The transport roller 16 is rotatably supported by the frame member (not shown). A winding roller (not shown) winds up the continuous sheet P by rotating in response to a rotational force received from a motor (not shown), so that the continuous sheet P is transported in the transport direction S.

The detector 18 includes a first detector 18A disposed between the head 12K and the head 12C, a second detector 18B disposed between the head 12C and the head 12M, a third detector 18C disposed between the head 12M and the head 12Y, and a fourth detector 18D disposed downstream of the head 12Y in the transport direction S. Each detector 18 is configured to detect a correction image formed on the continuous sheet P. For example, each detector 18 radiates light onto the correction image formed on the continuous sheet P and causes a light receiving element to receive reflection light from the correction image, thereby detecting the image position of the correction image. In the first exemplary embodiment, each detector 18 detects all correction images formed upstream of the detector 18 in the transport direction S. Then, the detector 18 transmits the image position of each detected correction image to a controller 20, to be described later.

Next, the hardware configuration of the image forming apparatus 10 will be described.

Figure 2:
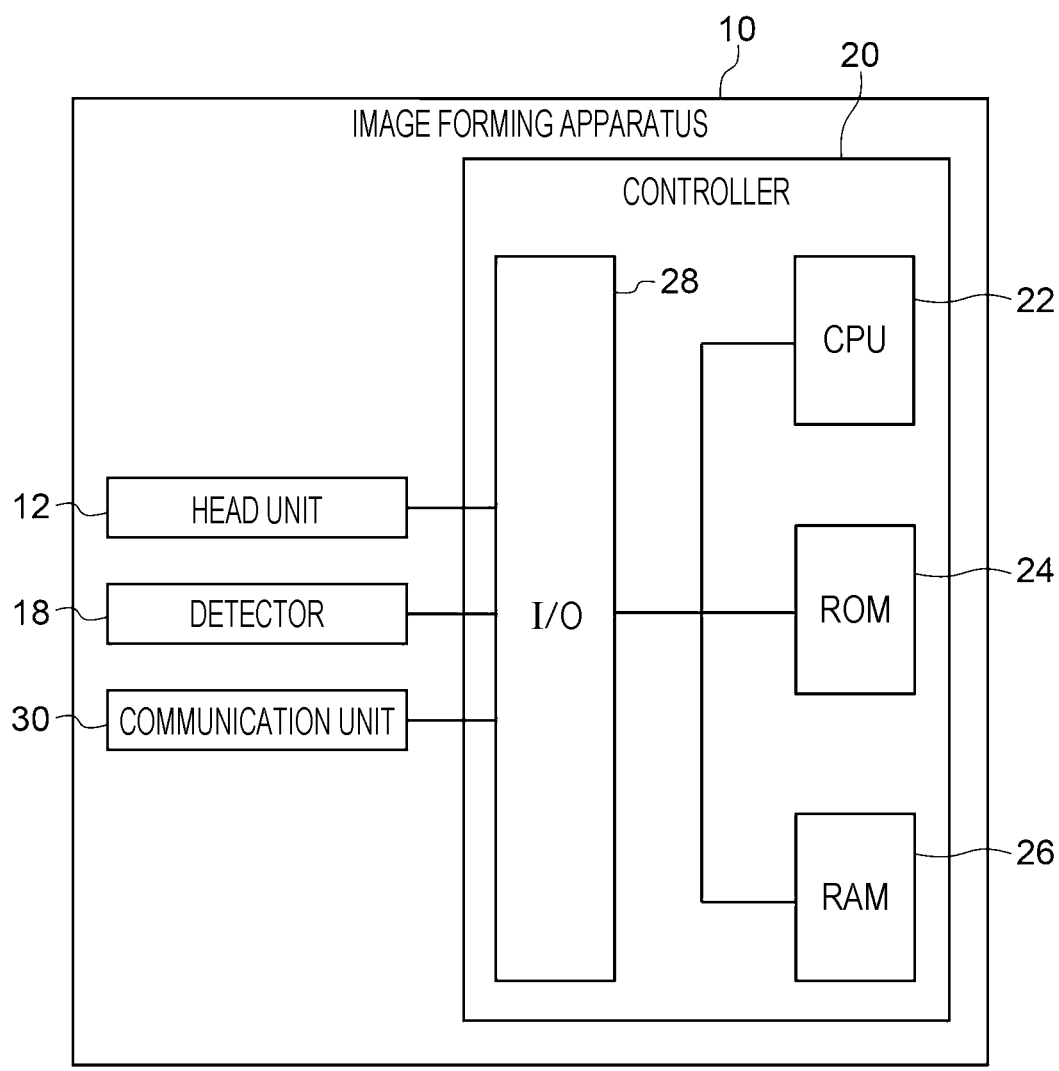
FIG. 2 is a block diagram illustrating a hardware configuration of the image forming apparatus according to the exemplary embodiment.

FIG. 2 is a block diagram illustrating the hardware configuration of the image forming apparatus 10.

As shown in FIG. 2, the image forming apparatus 10 includes the controller 20 that controls the operation of the image forming apparatus 10. In the controller 20, a central processing unit (CPU) 22, a read-only memory (ROM) 24, a random access memory (RAM) 26, and an input/output interface (I/O) 28 are connected to one another in a communicable manner via a bus.

The CPU 22 is a central processing unit that executes various types of programs and controls each component. Specifically, the CPU 22 reads a program from the ROM 24 and executes the program by using the RAM 26 as a work area. The CPU 22 performs control of the aforementioned components and various types of calculation processes in accordance with programs stored in the ROM 24.

The ROM 24 stores therein various types of programs and various types of data. The RAM 26 serves as a work area for temporarily storing a program or data. The I/O 28 is connected to the head unit 12, the detector 18, and a communication unit 30.

The communication unit 30 communicates with a terminal apparatus, such as a personal computer (not shown), via a network. For example, the Internet, a local area network (LAN), or a wide area network (WAN) is used as this network.

Next, the flow of a process for correcting the image position of an image to be formed on the continuous sheet P will be described with reference to FIGS. 3A to 3F. The correction is performed during printing of a print job input to the controller 20 via the communication unit 30.

FIGS. 3A to 3F illustrate an example of detection results obtained by the first detector 18A and the second detector 18B. In detail, FIGS. 3A to 3C illustrate the detection result obtained by the first detector 18A, and FIGS. 3D to 3F illustrate the detection result obtained by the second detector 18B.

First, the head 12K disposed at the most upstream position in the transport direction S forms a correction image at a predetermined image position on the continuous sheet P. The term "predetermined image position" refers to a widthwise end of a continuous sheet P to be cut off from the continuous sheet P before being supplied to a customer. The term "correction image" refers to an image that includes a shape based on which the image position is identifiable from the detection result of the image. The head 12K forms, as a correction image, a black triangular graphic mark (referred to as "K mark 40K" hereinafter) shown in FIG. 3A.

The first detector 18A detects the K mark 40K when the K mark 40K formed by the head 12K reaches a detection range as a result of transporting of the continuous sheet P.

In FIG. 3A, the detection position of the first detector 18A during a reference mode is indicated with a solid line, and the detection position of the first detector 18A during a measurement mode different from the reference mode is indicated with a dashed line. The solid line or the dashed line indicates the optical axis of the first detector 18A during the reference mode or the measurement mode. A section of the K mark 40K that overlaps this optical axis is irradiated with light.

The first detector 18A transmits, to the controller 20, a detection result of the K mark 40K detected during the measurement mode as measurement information. In FIG. 3B, the measurement information of the K mark 40K detected by the first detector 18A is indicated with a waveform of a dashed line.

Then, the CPU 22 compares the measurement information transmitted from the first detector 18A with reference information corresponding to the measurement information stored in the ROM 24. If an amount of displacement in the sheet width direction is larger than or equal to a threshold value, the CPU 22 corrects the image position of the head 12C in the sheet width direction before the head 12C performs an image forming process. In this case, the "correction" performed by the CPU 22 involves changing the nozzle numbers of ejection nozzles to be used. In other words, when the continuous sheet P bends while being transported and a so-called skew occurs, the CPU 22 changes the nozzle numbers of ejection nozzles to be used, that is, the image position where ink droplets are to be ejected, by the corresponding amount, thereby compensating for the effect of the skew. The CPU 22 is an example of a corrector.

The detection result of each correction image detected by the corresponding detector 18 during the reference mode is transmitted to the controller 20 and is preliminarily stored in the ROM 24 as reference information indicating the reference image position of the corresponding head of the head unit 12 on the continuous sheet P. In FIG. 3C, reference information of the K mark 40K detected by the first detector 18A and stored in the ROM 24 is indicated with a waveform of a solid line.

When the CPU 22 acquires the measurement information having the waveform shown in FIG. 3B from the first detector 18A, the CPU 22 compares the measurement information with reference information corresponding to the measurement information. For example, the CPU 22 determines a difference between an ON period $\alpha 1$ (see FIG. 3C) of the reference information of the head 12K and an ON period $\beta 1$ (see FIG. 3B) of the measurement information, and calculates the amount and direction of displacement in the sheet width direction from the reference image position of the head 12K. In this case, it is assumed in FIGS. 3A to 3C that the amount of displacement in the sheet width direction is larger than or equal to the threshold value. Therefore, in order to cope with the amount of displacement, the CPU 22 corrects the image position of the head 12C in the sheet width direction before the head 12C performs the image forming process, and, for example, increments the nozzle number of each ejection nozzle to be used by one.

Then, the head 12C disposed adjacently downstream of the head 12K in the transport direction S forms a correction image on the continuous sheet P such that the correction image is located adjacently upstream of the K mark 40K in the transport direction S. In this case, since the head 12C has undergone the correction described above, for example, the nozzle number of each ejection nozzle to be used has been incremented by one. In other words, in order to cope with the skew that has occurred in the transporting process, the head 12C shifts the image position where ink droplets are to be ejected from the reference image position. In FIG. 3D, the head 12C forms, as a correction image, a triangular graphic mark (referred to as "C mark 40C" hereinafter) with diagonal shading lines.

The second detector 18B detects the K mark 40K and the C mark 40C when the K mark 40K formed by the head 12K and the C mark 40C formed by the head 12C reach the detection range as a result of transporting of the continuous sheet P.

In FIG. 3D, the detection position of the second detector 18B during the reference mode is indicated with a solid line, and the detection position of the second detector 18B during the measurement mode is indicated with a dashed line. The solid line or the dashed line indicates the optical axis of the second detector 18B during the reference mode or the measurement mode. A section of the K mark 40K or the C mark 40C that overlaps this optical axis is irradiated with light.

The second detector 18B transmits, to the controller 20, detection results of the K mark 40K and the C mark 40C detected during the measurement mode as measurement information. In FIG. 3E, the measurement information of the K mark 40K and the C mark 40C detected by the second detector 18B is indicated with a waveform of a dashed line.

Then, the CPU 22 compares the measurement information transmitted from the second detector 18B with reference information corresponding to the measurement information stored in the ROM 24. If an amount of displacement in the sheet width direction is larger than or equal to the threshold value, the CPU 22 corrects the image position of the head 12C in the sheet width direction after the head 12C performs the image forming process. In FIG. 3F, reference information of the K mark 40K and the C mark 40C detected by the second detector 18B and stored in the ROM 24 is indicated with a waveform of a solid line.

When the CPU 22 acquires the measurement information having the waveform shown in FIG. 3E from the second detector 18B, the CPU 22 compares the measurement information with reference information corresponding to the measurement information. For example, the CPU 22 determines a difference between an ON period $\alpha 2$ (see FIG. 3F) of the reference information of the C mark 40C and an ON period $\beta 2$ (see FIG. 3E) of the measurement information of the C mark 40C, and calculates the amount and direction of displacement in the sheet width direction from the reference image position of the head 12C. In this case, it is assumed in FIGS. 3D to 3F that the amount of displacement in the sheet width direction is larger than or equal to the threshold value. Therefore, in order to cope with the amount of displacement, the CPU 22 corrects the image position of the head 12C in the sheet width direction after the head 12C performs the image forming process, and, for example, increments the nozzle number of each ejection nozzle to be used by one. The reason for correcting the head 12C after the head 12C performs the image forming process in this manner is to cope with a case where the effect of the skew is not sufficiently compensated for by simply performing the correction before the image forming process. By performing the correction after the image forming process, the image position is changed in the sheet width direction at the time of a subsequent image forming process of the head 12C, so that positional displacement in the image position of the head 12C may be suppressed. This "positional displacement in the image position" refers to so-called color misregistration occurring as a result of displacement in relative positions among images formed by the heads of the head unit 12.

The CPU 22 uses the C mark 40C detected by the second detector 18B to correct the image position of the head 12M in the sheet width direction before the head 12M performs an image forming process. In detail, by using an amount of displacement in the sheet width direction from the reference image position of the head 12C calculated above, the CPU 22 corrects the image position of the head 12M in the sheet width direction before the head 12M performs the image forming process so as to cope with the amount of displacement, and, for example, increments the nozzle number of each ejection nozzle to be used by one.

The subsequent flow of the correction will be described while simplifying descriptions that are redundant with the above description.

The head 12M disposed adjacently downstream of the head 12C in the transport direction S forms a correction image on the continuous sheet P such that the correction image is located adjacently upstream of the C mark 40C in the transport direction S. The correction image formed by the head 12M will be referred to as "M mark".

If the amount of displacement in the sheet width direction is larger than or equal to the threshold value, the CPU 22 uses the M mark detected by the third detector 18C to correct the image position of the head 12M in the sheet width direction after the image forming process thereof, and to further correct the image position of the head 12Y in the sheet width direction before an image forming process thereof.

The head 12Y disposed adjacently downstream of the head 12M in the transport direction S forms a correction image on the continuous sheet P such that the correction image is located adjacently upstream of the M mark in the transport direction S. The correction image formed by the head 12Y will be referred to as "Y mark".

If the amount of displacement in the sheet width direction is larger than or equal to the threshold value, the CPU 22 uses the Y mark detected by the fourth detector 18D to correct the image position of the head 12Y in the sheet width direction after the image forming process thereof.

Effects

In an existing configuration in the related art (referred to as "comparative configuration" hereinafter), a correction image formed by the most-upstream head of the head unit 12 in the transport direction S is detected by the detector 18 located upstream of other heads of the head unit 12 that are disposed downstream of the most-upstream head of the head unit 12, and the image positions of the other heads of the head unit 12 in the sheet width direction are corrected. In the following description, the "correction image" in the comparative configuration will be replaced with the "K mark 40K" according to the first exemplary embodiment.

When a skew occurs during the transporting of the continuous sheet P, the continuous sheet P fluctuates in the sheet width direction from when the K mark 40K is detected to when a head of the head unit 12 disposed downstream of the detector 18 that has detected the K mark 40K forms an image, causing positional displacement of the image position to occur. In the comparative configuration, only the head of the head unit 12 disposed downstream of the detector 18 that has detected the K mark 40K is corrected before the head of the head unit 12 performs an image forming process, that is, only a feed forward correction is performed. Thus, a subsequent image forming process is performed without resolving the aforementioned positional displacement of the image position.

In contrast, in the first exemplary embodiment, the CPU 22 uses the K mark 40K detected by the first detector 18A and the C mark 40C detected by the second detector 18B to correct the image position of the head 12C in the sheet width direction. Moreover, the second detector 18B is disposed downstream of the head 12C in the transport direction S. In other words, in the first exemplary embodiment, the image position of the head 12C in the sheet width direction is corrected after the head 12C performs the image forming process, and the positional displacement of the image position of the head 12C is resolved before a subsequent image forming process.

Accordingly, the first exemplary embodiment involves performing a feedback correction on a head of the head unit 12 targeted for the correction. Therefore, according to the first exemplary embodiment, positional displacement of the image position in the sheet width direction may be suppressed, as compared with the comparative configuration. In detail, in this case, positional displacement of the image position in the sheet width direction may be suppressed in a subsequent image forming process, as compared with the comparative configuration.

Furthermore, in the first exemplary embodiment, the CPU 22 uses the K mark 40K detected by the first detector 18A to correct the image position of the head 12C in the sheet width direction before the head 12C performs an image forming process, and uses the C mark 40C detected by the second detector 18B to correct the image position of the head 12C in the sheet width direction after the head 12C performs the image forming process.

Specifically, according to the first exemplary embodiment, the image position of the head 12C in the sheet width direction is corrected before and after the head 12C performs the image forming process.

Furthermore, in the first exemplary embodiment, the CPU 22 uses the C mark 40C detected by the second detector 18B to correct the image position of the head 12M in the sheet width direction before the head 12M performs an image forming process. In other words, in the first exemplary embodiment, the C mark 40C detected by the second detector 18B is used both for correcting the image position of the head 12C in the sheet width direction after the image forming process thereof and for correcting the image position of the head 12M in the sheet width direction before the image forming process thereof.

Accordingly, in the first exemplary embodiment, the head 12M performs an image forming process in accordance with the image position of the head 12C in the sheet width direction set in view of the detection result of the second detector 18B. Therefore, according to the first exemplary embodiment, positional displacement of the image position of the head 12M in the sheet width direction may be suppressed, as compared with a configuration that corrects the image position of the head 12M in the sheet width direction by using the K mark 40K detected by the second detector 18B.

Second Exemplary Embodiment

Next, a second exemplary embodiment will be described while omitting or simplifying descriptions that are redundant with the first exemplary embodiment.

In the second exemplary embodiment, the image positions of correction images to be formed by the heads of the head unit 12 disposed downstream of the head 12K in the transport direction S are different from those in the first exemplary embodiment.

Figure 4:
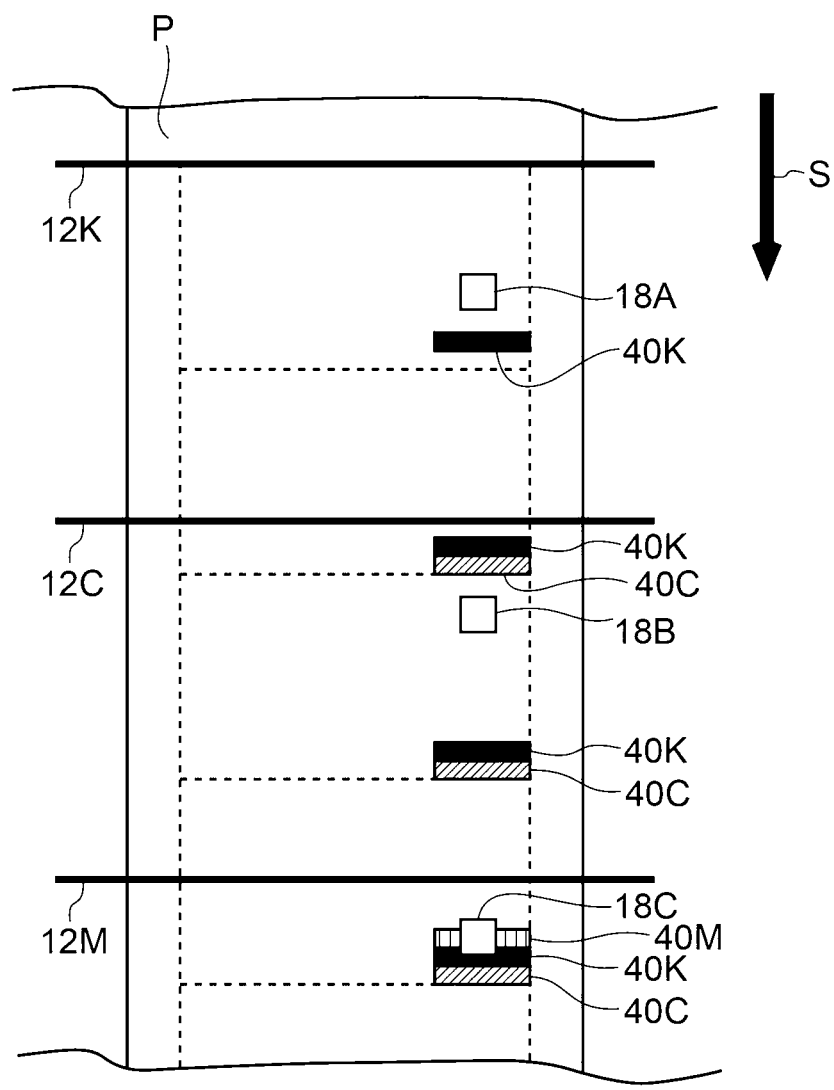
FIG. 4 illustrates an example of image positions of correction images according to a second exemplary embodiment.

FIG. 4 illustrates an example of the image positions of correction images according to the second exemplary embodiment. In FIG. 4, each correction image is indicated with a rectangular graphic mark. Specifically, the black rectangular graphic mark indicates a "K mark 40K", the rectangular graphic mark with diagonal shading lines indicates a "C mark 40C", and the rectangular graphic mark with vertical lines indicates an "M mark 40M".

As shown in FIG. 4, the head unit 12 according to the second exemplary embodiment forms the K mark 40K between the C mark 40C and the M mark 40M in the transport direction S. In detail, the head 12C forms the C mark 40C on the continuous sheet P such that the C mark 40C is disposed adjacently downstream of the K mark 40K in the transport direction S. The head 12M forms the M mark 40M on the continuous sheet P such that the M mark 40M is disposed adjacently upstream of the K mark 40K in the transport direction S.

In the second exemplary embodiment, the K mark 40K is interposed between the C mark 40C and the M mark 40M in the transport direction S so that the distance between the C mark 40C or the M mark 40M and the K mark 40K becomes shorter in the transport direction S, as compared with a configuration in which the C mark 40C and the M mark 40M are successively disposed. When the distance to the K mark 40K in the transport direction S becomes shorter, the amount of fluctuation in the sheet width direction is reduced when a skew occurs during the transporting of the continuous sheet P.

Therefore, according to the second exemplary embodiment, positional displacement of the image position in the sheet width direction may be suppressed, as compared with a configuration in which the C mark 40C and the M mark 40M are successively disposed upstream or downstream of the K mark 40K in the transport direction S.

Third Exemplary Embodiment

Next, a third exemplary embodiment will be described while omitting or simplifying descriptions that are redundant with other exemplary embodiments.

In the third exemplary embodiment, a correction of the image position in the transport direction S is performed in addition to the correction of the image position in the sheet width direction.

The CPU 22 according to the third exemplary embodiment uses the K mark 40K detected by the first detector 18A to correct the image position of the head 12C in the transport direction S before the head 12C performs an image forming process.

The CPU 22 compares measurement information transmitted from the first detector 18A with reference information corresponding to the measurement information stored in the ROM 24. If an amount of displacement in the transport direction S is larger than or equal to a threshold value, the CPU 22 corrects the image position of the head 12C in the transport direction S before the head 12C performs the image forming process. In this case, the "correction" performed by the CPU 22 involves adjusting the timing for ejecting ink droplets from the nozzles. In other words, if the detection timing by the detector 18 is earlier than expected, the CPU 22 advances the timing for ejecting ink droplets by the corresponding amount. If the detection timing by the detector 18 is later than expected, the CPU 22 retards the timing for ejecting ink droplets by the corresponding amount.

Furthermore, the CPU 22 uses the C mark 40C detected by the second detector 18B to correct the image position of the head 12C in the transport direction S after the head 12C performs the image forming process. The reason for correcting the head 12C after the head 12C performs the image forming process in this manner is to cope with a case where positional displacement of the image position in the transport direction S is not sufficiently compensated for by simply performing the correction before the image forming process. By performing the correction after the image forming process, the image position is changed in the transport direction S at the time of a subsequent image forming process of the head 12C, so that positional displacement in the image position of the head 12C may be suppressed. This case is similar to the above in that the CPU 22 compares measurement information transmitted from the second detector 18B with reference information corresponding to the measurement information stored in the ROM 24. In view of the correction result, if an amount of displacement in the transport direction S is larger than or equal to the threshold value, the CPU 22 corrects the image position of the head 12C in the transport direction S after the head 12C performs the image forming process.

Moreover, the CPU 22 uses the C mark 40C detected by the second detector 18B to correct the image position of the head 12M in the transport direction S before the head 12M performs an image forming process. In detail, by using an amount of displacement in the transport direction S calculated using the C mark 40C detected by the second detector 18B, the CPU 22 corrects the image position of the head 12M in the transport direction S before the head 12M performs the image forming process so as to cope with the amount of displacement, and adjusts the timing for ejecting ink droplets from the nozzles.

As described above, in the third exemplary embodiment, the CPU 22 uses the K mark 40K detected by the first detector 18A to correct the image position of the head 12C in the transport direction S before the head 12C performs the image forming process, and uses the C mark 40C detected by the second detector 18B to correct the image position of the head 12C in the transport direction S after the head 12C performs the image forming process.

In other words, in the third exemplary embodiment, the image position of the head 12C in the transport direction S is corrected before and after the head 12C performs the image forming process.

Furthermore, in the third exemplary embodiment, the CPU 22 uses the C mark 40C detected by the second detector 18B to correct the image position of the head 12M in the transport direction S before the head 12M performs an image forming process. In other words, in the third exemplary embodiment, the C mark 40C detected by the second detector 18B is used both for correcting the image position of the head 12C in the transport direction S after the image forming process thereof and for correcting the image position of the head 12M in the transport direction S before the image forming process thereof.

Accordingly, in the third exemplary embodiment, the head 12M performs the image forming process in accordance with the image position of the head 12C in the transport direction S set in view of the detection result of the second detector 18B. Therefore, according to the third exemplary embodiment, positional displacement of the image position of the head 12M in the transport direction S may be suppressed, as compared with a configuration that corrects the image position of the head 12M in the transport direction S by using the K mark 40K detected by the second detector 18B.

Other Exemplary Embodiments

In the above exemplary embodiments, the "correction of the image position in the sheet width direction" involves changing the nozzle numbers of ejection nozzles to be used. Alternatively, the above-described correction may involve moving a head of the head unit 12 targeted for the correction in the sheet width direction. In this case, the CPU 22 uses the detection result of each detector 18 to calculate an amount of movement of the head of the head unit 12 targeted for the correction in the sheet width direction. Then, a moving unit, such as an actuator, is driven, so that the head of the head unit 12 targeted for the correction is moved in the sheet width direction by the amount of movement calculated by the CPU 22. In the case of such a configuration, the aforementioned moving unit serves as an example of a corrector.

In the above exemplary embodiments, the "correction of the image position in the transport direction S" involves adjusting the timing for ejecting ink droplets from the nozzles. Alternatively, the above-described correction may involve moving a head of the head unit 12 targeted for the correction in the transport direction S. In this case, the CPU 22 uses the detection result of each detector 18 to calculate an amount of movement of the head of the head unit 12 targeted for the correction in the transport direction S. Then, a moving unit, such as an actuator, is driven, so that the head of the head unit 12 targeted for the correction is moved in the transport direction S by the amount of movement calculated by the CPU 22. In the case of such a configuration, the aforementioned moving unit serves as an example of a corrector.

In the above exemplary embodiments, if an amount of displacement in the sheet width direction or the transport direction S is larger than or equal to the threshold value, the correction is performed both before and after a head of the head unit 12 targeted for the correction performs an image forming process. Alternatively, if an amount of displacement in the sheet width direction or the transport direction S is larger than or equal to the threshold value, the correction may be performed only after the image forming process without being performed before the image forming process. In this case, the correction after the image forming process is desirably performed by using detection results obtained by detectors 18 disposed upstream and downstream, in the transport direction S, of the head of the head unit 12 targeted for the correction.

In the above exemplary embodiments, the correction before the head 12C performs an image forming process is performed by using the K mark 40K, and the corrections before the head 12M and the head 12Y perform image forming processes are performed by using the C mark 40C or the M mark formed by the head 12C or the head 12M disposed upstream of the head 12M or the head 12Y in the transport direction S. Alternatively, the corrections before the head 12C, the head 12M, and the head 12Y perform image forming processes may all be performed by using the K mark 40K formed by the head 12K, or by using both the K mark 40K and a correction image formed by the head of the head unit 12 disposed adjacently upstream, in the transport direction S, of the head of the head unit 12 targeted for the correction.

As an alternative to the above exemplary embodiments in which a correction is performed during printing of a print job, the correction may be performed independently prior to printing.

Although the image forming apparatus 10 is of an inkjet type in the above exemplary embodiments, the image forming apparatus 10 is not limited to an inkjet type.

Figure 5:
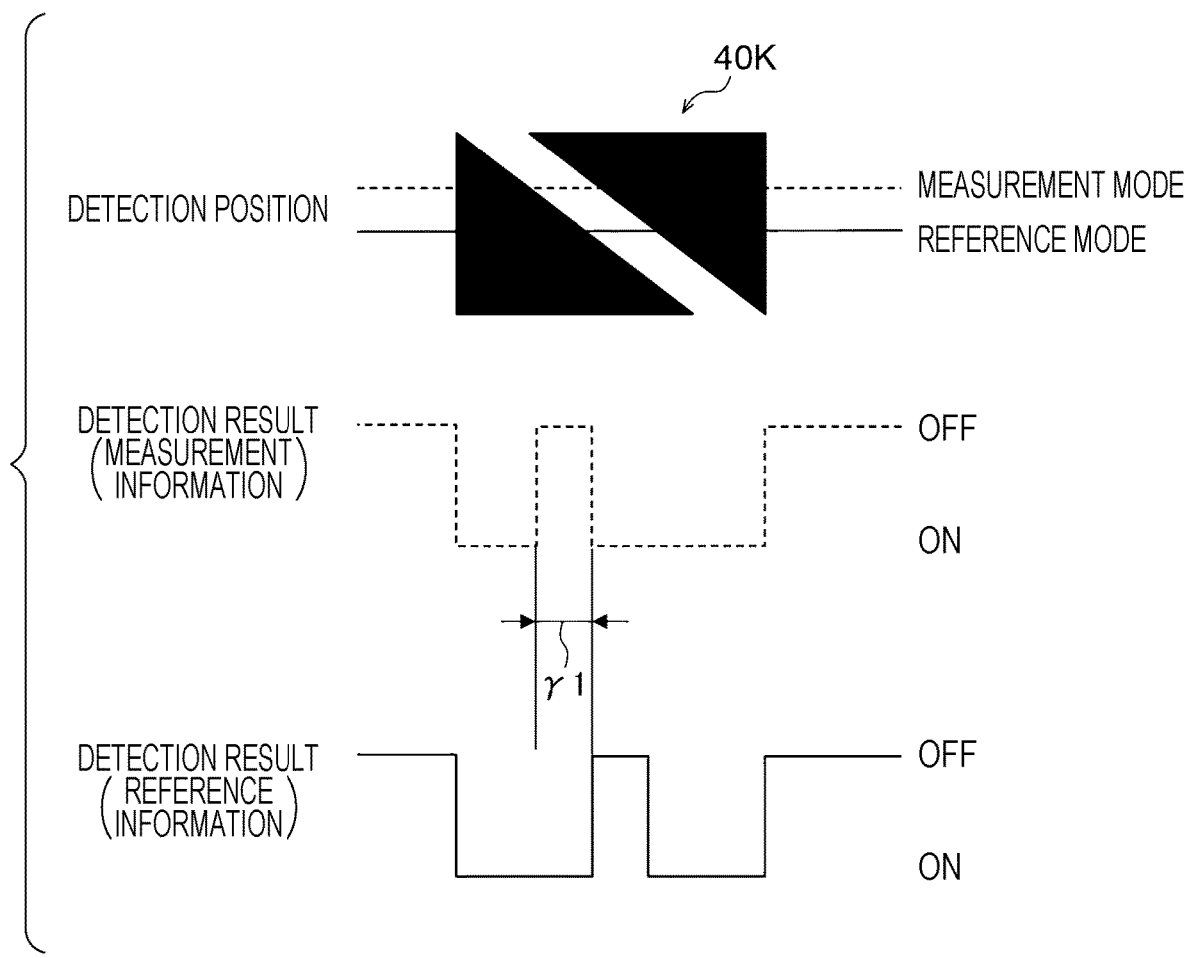
FIG. 5 illustrates another example of a correction image according to an exemplary embodiment.

Although each correction image is a triangular graphic mark or a rectangular graphic mark in the above exemplary embodiments, other images may be used as correction images. For example, as shown in FIG. 5, a graphic mark in which hypotenuses of two right triangles face each other may be used as a correction image. In a case where a correction image is formed as shown in FIG. 5, the CPU 22 may determine a difference γ1 between the first end point of an ON period of reference information of the correction image (e.g., K mark 40K) and the first end point of an ON period of measurement information of the correction image, and may calculate the amount and direction of displacement in the sheet width direction from the reference image position of the head of the head unit 12 targeted for the correction.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
    an image forming unit that includes a first image forming unit and a second image forming unit disposed downstream of the first image forming unit in a transport direction of a recording medium, the image forming unit causing the first image forming unit and the second image forming unit to form predetermined correction images onto the recording medium;
    a first detector that is disposed downstream of the first image forming unit in the transport direction and upstream of the second image forming unit in the transport direction and that detects the correction image formed by the first image forming unit;
    a second detector that is disposed downstream of the second image forming unit in the transport direction and that at least detects the correction image formed by the second image forming unit; and
    a corrector that corrects an image position of the second image forming unit in a width direction of the recording medium by using the correction image formed by the first image forming unit and detected by the first detector and the correction image formed by the second image forming unit and detected by the second detector.

2. The image forming apparatus according to claim 1, wherein the corrector uses the correction image formed by the first image forming unit and detected by the first detector to correct the image position of the second image forming unit in the width direction before the second image forming unit performs an image forming process, and uses the correction image formed by the second image forming unit and detected by the second detector to correct the image position of the second image forming unit in the width direction.

3. The image forming apparatus according to claim 2, wherein the image forming unit further includes a third image forming unit disposed downstream of the second detector in the transport direction, and
wherein the corrector uses the correction image formed by the second image forming unit and detected by the second detector to correct an image position of the third image forming unit in the width direction before the third image forming unit performs an image forming process.

4. The image forming apparatus according to claim 3, wherein the image forming unit performs an image forming process such that the correction image formed by the first image forming unit is interposed, in the transport direction, between the correction image formed by the second image forming unit and a correction image formed by the third image forming unit.

5. The image forming apparatus according to claim 4, wherein the corrector uses the correction image formed by the first image forming unit and detected by the first detector to correct the image position of the second image forming unit in the transport direction before the second image forming unit performs an image forming process, and uses the correction image formed by the second image forming unit and detected by the second detector to correct the image position of the second image forming unit in the transport direction.

6. The image forming apparatus according to claim 5, wherein the image forming unit includes the third image forming unit disposed downstream of the second detector in the transport direction, and
wherein the corrector uses the correction image formed by the second image forming unit and detected by the second detector to correct the image position of the third image forming unit in the transport direction before the third image forming unit performs the image forming process.

7. The image forming apparatus according to claim 3, wherein the corrector uses the correction image formed by the first image forming unit and detected by the first detector to correct the image position of the second image forming unit in the transport direction before the second image forming unit performs an image forming process, and uses the correction image formed by the second image forming unit and detected by the second detector to correct the image position of the second image forming unit in the transport direction.

8. The image forming apparatus according to claim 7, wherein the image forming unit includes the third image forming unit disposed downstream of the second detector in the transport direction, and
wherein the corrector uses the correction image formed by the second image forming unit and detected by the second detector to correct the image position of the third image forming unit in the transport direction before the third image forming unit performs the image forming process.

9. The image forming apparatus according to claim 2, wherein the corrector uses the correction image formed by the first image forming unit and detected by the first detector to correct the image position of the second image forming unit in the transport direction before the second image forming unit performs an image forming process, and uses the correction image formed by the second image forming unit and detected by the second detector to correct the image position of the second image forming unit in the transport direction.

10. The image forming apparatus according to claim 9, wherein the image forming unit further includes a third image forming unit disposed downstream of the second detector in the transport direction, and
wherein the corrector uses the correction image formed by the second image forming unit and detected by the second detector to correct an image position of the third image forming unit in the transport direction before the third image forming unit performs an image forming process.

11. The image forming apparatus according to claim 1, wherein the image forming unit further includes a third image forming unit disposed downstream of the second detector in the transport direction, and
wherein the corrector uses the correction image formed by the second image forming unit and detected by the second detector to correct an image position of the third image forming unit in the width direction before the third image forming unit performs an image forming process.

12. The image forming apparatus according to claim 11, wherein the image forming unit performs an image forming process such that the correction image formed by the first image forming unit is interposed, in the transport direction, between the correction image formed by the second image forming unit and a correction image formed by the third image forming unit.

13. The image forming apparatus according to claim 12, wherein the corrector uses the correction image formed by the first image forming unit and detected by the first detector to correct the image position of the second image forming unit in the transport direction before the second image forming unit performs an image forming process, and uses the correction image formed by the second image forming unit and detected by the second detector to correct the image position of the second image forming unit in the transport direction.

14. The image forming apparatus according to claim 13, wherein the image forming unit includes the third image forming unit disposed downstream of the second detector in the transport direction, and
wherein the corrector uses the correction image formed by the second image forming unit and detected by the second detector to correct the image position of the third image forming unit in the transport direction before the third image forming unit performs the image forming process.

15. The image forming apparatus according to claim 11, wherein the corrector uses the correction image formed by the first image forming unit and detected by the first detector to correct the image position of the second image forming unit in the transport direction before the second image forming unit performs an image forming process, and uses the correction image formed by the second image forming unit and detected by the second detector to correct the image position of the second image forming unit in the transport direction.

16. The image forming apparatus according to claim 15, wherein the image forming unit includes the third image forming unit disposed downstream of the second detector in the transport direction, and
wherein the corrector uses the correction image formed by the second image forming unit and detected by the second detector to correct the image position of the third image forming unit in the transport direction before the third image forming unit performs the image forming process.

17. The image forming apparatus according to claim 1, wherein the corrector uses the correction image formed by the first image forming unit and detected by the first detector to correct the image position of the second image forming unit in the transport direction before the second image forming unit performs an image forming process, and uses the correction image formed by the second image forming unit and detected by the second detector to correct the image position of the second image forming unit in the transport direction.

18. The image forming apparatus according to claim 17, wherein the image forming unit further includes a third image forming unit disposed downstream of the second detector in the transport direction, and
wherein the corrector uses the correction image formed by the second image forming unit and detected by the second detector to correct an image position of the third image forming unit in the transport direction before the third image forming unit performs an image forming process.

19. An image forming apparatus comprising:
image forming means for causing first image forming means and second image forming means to form predetermined correction images onto a recording medium, the image forming means including the first image forming means and the second image forming means disposed downstream of the first image forming means in a transport direction of the recording medium;
first detecting means for detecting the correction image formed by the first image forming means, the first detecting means being disposed downstream of the first image forming means in the transport direction and upstream of the second image forming means in the transport direction;
second detecting means for at least detecting the correction image formed by the second image forming means, the second detecting means being disposed downstream of the second image forming means in the transport direction; and
correcting means for correcting an image position of the second image forming means in a width direction of the recording medium by using the correction image formed by the first image forming means and detected by the first detecting means and the correction image formed by the second image forming means and detected by the second detecting means.

* * * * *